(12) United States Patent
Niederman et al.

(10) Patent No.: US 6,338,498 B1
(45) Date of Patent: Jan. 15, 2002

(54) SIDE AIR BAG PROVIDING ENHANCED COVERAGE

(75) Inventors: Robert Raymond Niederman, Dayton, OH (US); Jeffrey Allen Welch, Washington, MI (US)

(73) Assignee: Delphi Technologies, Inc, Troy, MI (US)

( * ) Notice: Subject to any disclaimer, the term of this patent is extended or adjusted under 35 U.S.C. 154(b) by 0 days.

(21) Appl. No.: 09/697,000

(22) Filed: Oct. 26, 2000

(51) Int. Cl.[7] ............................................... B60R 21/22
(52) U.S. Cl. .................. 280/728.2; 280/730.2
(58) Field of Search .......................... 280/728.2, 730.1, 280/730.2

(56) References Cited

U.S. PATENT DOCUMENTS

| 6,135,493 A | * | 10/2000 | Jost et al. |
| 6,155,596 A | * | 12/2000 | Nakajima et al. |
| 6,168,191 B1 | * | 1/2001 | Webber et al. |
| 6,170,860 B1 | * | 1/2001 | Denz et al. |
| 6,224,091 B1 | * | 5/2001 | Eyrainer et al. |
| 6,237,937 B1 | * | 5/2001 | Kokeguchi et al. |
| 6,237,941 B1 | * | 5/2001 | Bailey et al. |
| 6,244,619 B1 | * | 6/2001 | Satzger |

* cited by examiner

*Primary Examiner*—Paul N. Dickson
(74) *Attorney, Agent, or Firm*—Kathryn A. Marra

(57) ABSTRACT

An inflatable curtain structure for deployment within the interior of a transportation vehicle. The curtain structure includes a main body portion and an inflatable portion above the main body portion. The curtain structure is attached to the roof rail of the vehicle at locations of attachment extending in a hinge forming pattern between the main body portion and the inflatable portion above the main body portion such that upon inflation of the inflatable curtain structure the inflatable portion disposed above the main body portion expands in cushioning relation between the roof rail and the occupant.

16 Claims, 2 Drawing Sheets

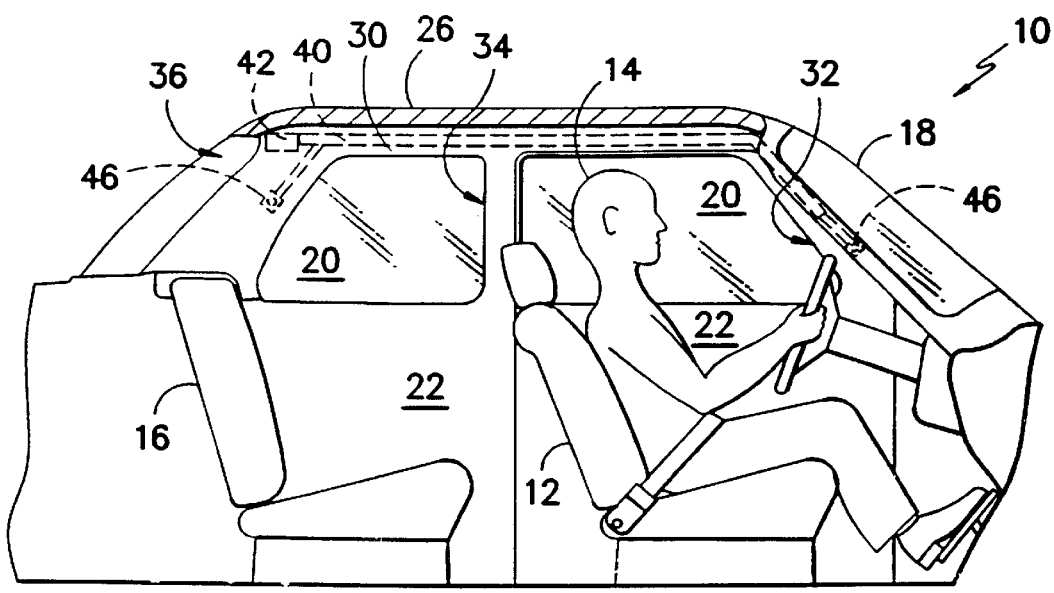
FIG. -1-
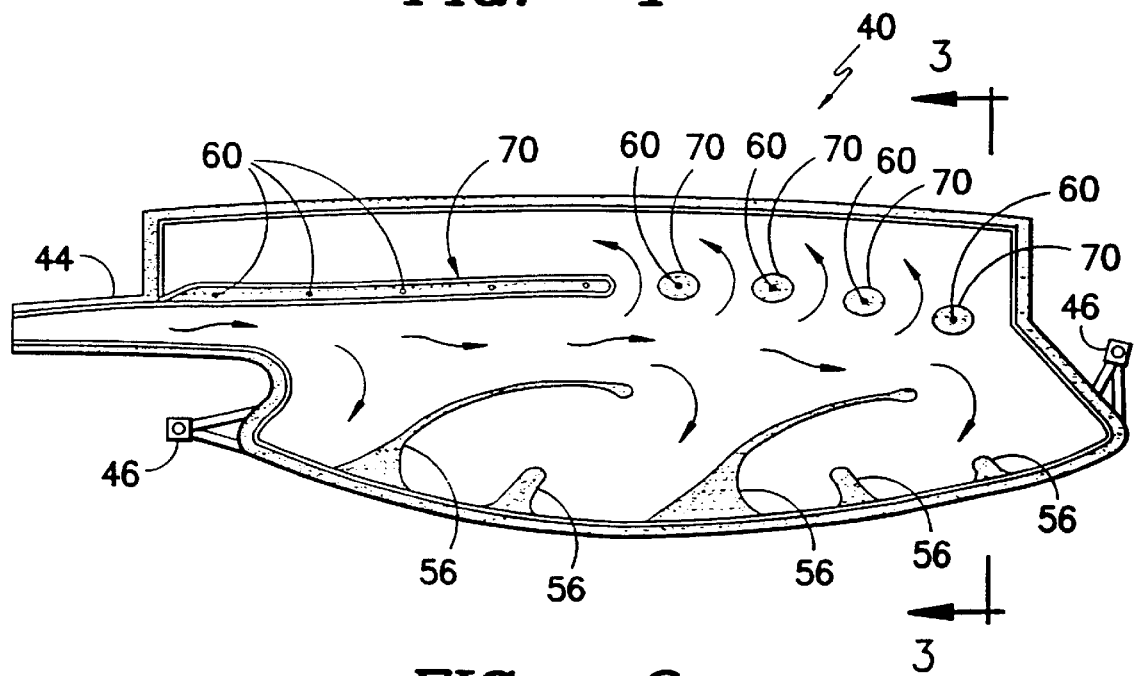
FIG. -2-

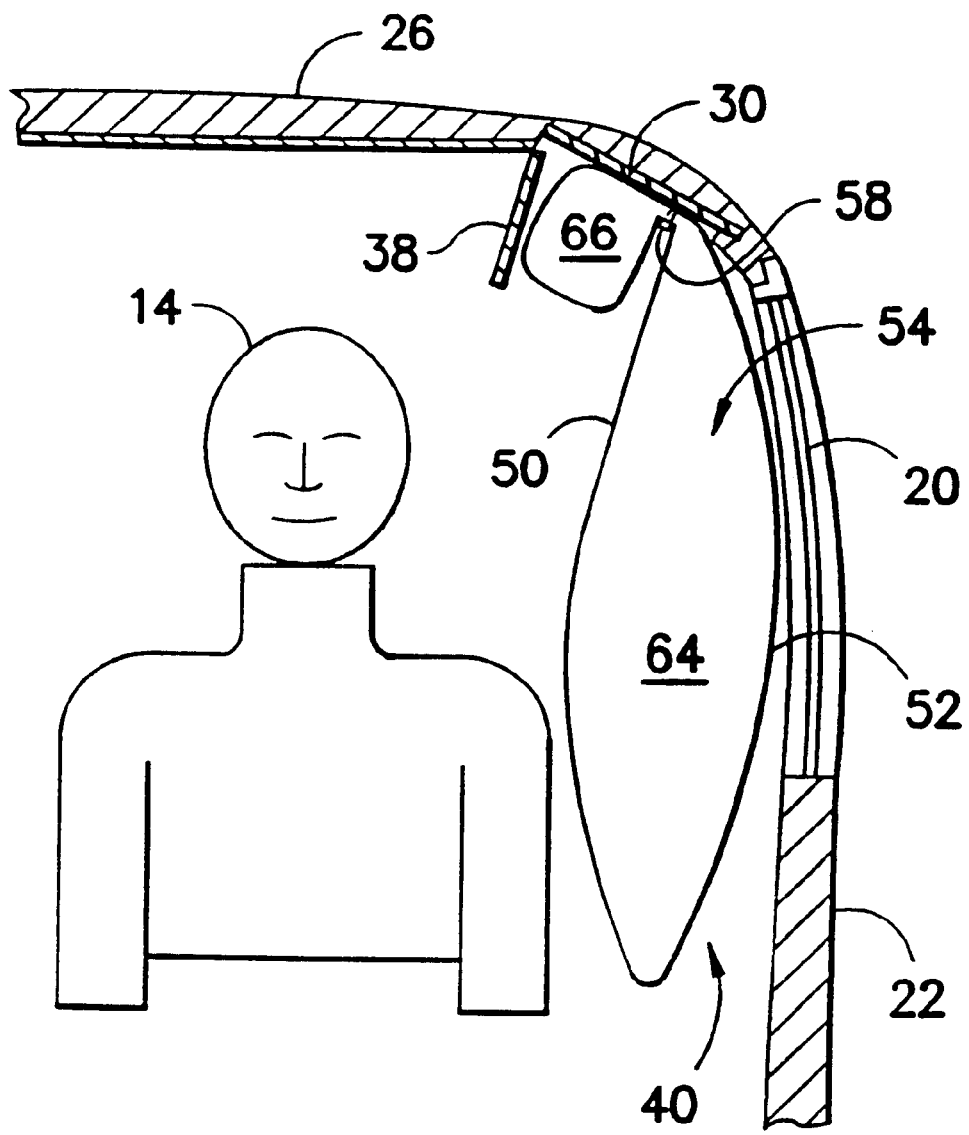
FIG. -3-

SIDE AIR BAG PROVIDING ENHANCED COVERAGE

TECHNICAL FIELD

The present invention relates to an inflatable air bag cushion for use in covering a side portion of a vehicle interior adjacent to an occupant to be protected during a collision event, and more particularly to an inflatable air bag cushion of substantially curtain-like structure for deployment away from the roof rail of the vehicle which air bag cushion includes an upwardly extending inflatable portion for deployment over the roof rail during a collision event.

BACKGROUND OF THE INVENTION

It is well known in motor vehicles to provide air bag cushions for protecting a vehicle occupant wherein such air bag cushions are in fluid communication with gas generating inflators so as to inflate the cushions upon sensing predetermined vehicle conditions such as deceleration exceeding a certain level. It is further known to provide air bag systems including inflatable restraint cushions which are deployed from positions of attachment to the vehicle frame along the roof rail portion of the vehicle frame so as to extend downwardly in substantially curtain-like fashion between an occupant to be protected and the side portions of the vehicle adjacent to such occupant. Such coverage is intended to provide cushioning restraint for the occupant during a side impact or extended roll-over collision event. Such curtain-like structures thereby provide protection to the vehicle occupant in the regions below the roof rail of the vehicle. That is, the protection afforded by such downwardly deployed curtain-like structures extends substantially in the region below the zone of attachment along the roof rail.

In some instances such as during an extended roll-over event, it is contemplated that an occupant may come into contact with portions of the roof rail structure and the area above such structure. However, prior to the present invention, cushioning of these regions as well as the region below the roof rail is not believed to have been available using a single cushion construction.

SUMMARY OF THE INVENTION

This invention provides advantages and alternatives over the prior art by providing an air bag cushion which is deployed from a location along the roof rail portion of a vehicle frame in substantially curtain-like fashion across the sides of the vehicle interior over an expansive area adjacent to an occupant to be protected. The air bag cushion of the present invention further includes an inflatable region which expands upwardly towards the roof of the vehicle upon introduction of an inflating gas. Upon encountering resistance from the roof or other obstructive portion of the vehicle, the portion of the air bag cushion which expands upwardly away from the roof folds over at least a portion of the roof rail in a hinge-like manner thereby providing additional cushioning over the regions adjacent to the occupant to be protected. The curtain-like cushion of the present invention thus provides an extent of cushioning coverage which is not believed to have been provided by a single inflatable structure heretofore.

Preferably the air bag cushion of the present invention is attached to the roof rail portion of the vehicle frame along a line of attachment such that inflation is substantially restricted along the line of attachment thereby enhancing the ability of the inflatable region above the line of attachment to hinge downwardly over the roof rail region upon encountering resistance by the roof of the vehicle.

In accordance with another potentially preferred aspect of the present invention, the air bag cushion may include regions of restricted inflation extending in a pattern corresponding to the pattern of the roof rail so as to further promote the hinging action of the inflatable region above the roof rail as inflation takes place.

Advantageously, the air bag cushion of the present invention permits the cushioning coverage over the zone of attachment of the curtain-like structure as well as in the region below such line of attachment using a single cushion structure which may be inflated by a single gas generating inflator. The present invention thus provides a useful advantage over prior curtain-like air bag structures which did not provide enhanced cushioning coverage over the roof rail portion of the vehicle.

BRIEF DESCRIPTION OF THE DRAWINGS

The accompanying drawings which are incorporated in and which constitute a part of this specification illustrate a potentially preferred embodiment of the present invention and, together with the general description of the invention given above and the detailed description set forth below, serve to explain the principles of the invention wherein:

FIG. 1 is a cut-away view of the interior of an automotive vehicle incorporating a curtain-like air bag cushion according to the present invention disposed along the roof rail portion of the vehicle frame;

FIG. 2 illustrates one embodiment of a curtain-like air bag cushion according to the present invention including an inflatable region extending above the line of attachment of such air bag cushion to the frame of an automotive vehicle; and FIG. 3 is a representative view of the deployment of a curtain-like air bag cushion according to the present invention taken along line 3—3 in FIG. 2.

While the invention has been illustrated and generally described above and will hereinafter be described in connection with certain potentially preferred embodiments, it is to be understood that in no event is the invention to be limited to such illustrated and described embodiments. On the contrary it is intended that the present invention shall extend to all alternatives and modifications as may embrace the broad principles of this invention within the true spirit and scope thereof.

DESCRIPTION OF THE PREFERRED EMBODIMENT

Turning now to the drawings wherein like reference numerals have been utilized to designate like components throughout the various view, in FIG. 1 there is illustrated a vehicle 10. The vehicle 10 includes a front seat 12 which may be used to support a front seated vehicle occupant 14. The vehicle 10 further includes a rear seat 16 which may be used to support a rear occupant (not shown). While the front seat 12 and the rear seat 16 are illustrated as being located on the driver's side of the vehicle 10, it is to be appreciated that the present invention is also useful in the protection of an occupant (not shown) seated in either the front seat or rear seat on the passenger side of the vehicle 10.

In order to provide visibility to the occupants of the vehicle 10, the vehicle 10 is provided with a windshield 18 as well as with one or more side windows 20. As illustrated, the side windows 20 are located generally adjacent to the seats 12, 16 to the sides of the occupants seated therein. The vehicle 10 preferably includes one or more doors 22 which extend adjacent to the vehicle occupants towards a roof 26.

As will be appreciated by those of skill in the art, the vehicle 10 preferably includes a structural frame formed from an arrangement of structural support members including a roof rail 30 disposed at the intersection between the doors 22 and the roof 26. The vehicle 10 also includes a series of structural support pillars 32, 34, 36 which extend downwardly from the roof rail 30. The structural support pillar 32 which extends between the windshield 18 and the side window 20 adjacent to the front seat 12 is commonly referred to as the "A" pillar. The structural support pillar 34 which is disposed intermediate the side windows 20 is commonly referred to as the "B" pillar. The structural support pillar 36 which is disposed rearward of the side window 20 adjacent to the rear seat 16 is commonly referred to as the "C" pillar. As will be appreciated, each of the structural support pillars 32, 34, 36 are preferably covered by a trim piece which extends in elongate fashion away from the roof rail 30. The roof rail 30 is likewise preferably covered by a trim piece or head lining material 38 as shown in FIG. 3 which will permit the egress of an air bag cushion in the manner as described hereinafter.

As illustrated in FIG. 1, it is contemplated that an air bag cushion in the form of an inflatable curtain structure 40 may be stored in rolled or folded fashion in attached relation to the vehicle frame along at least a portion of the roof rail 30. It is also contemplated that portions of the inflatable curtain structure 40 may be stored along portions of the "A" pillar 32 and/or along portions of the "C" pillar 36. As shown, the inflatable curtain structure 40 is preferably in fluid communication with a gas discharging inflator 42 as is well know to those of skill in the art such that gas may be discharged from the inflator 42 and into an inlet opening 44 (FIG. 2) to effect deployment of the inflatable curtain structure 40. As illustrated, the inflatable curtain structure 40 may also be attached to tethering elements 46 disposed at locations to promote the desired deployment path for the inflatable curtain structure upon inflation by the inflator 42. As will be appreciated, the inflatable curtain structure 40, inflator 42, and tethering elements 46 are preferably hidden from view by the overlying trim. Thus, prior to activation the inflatable curtain structure 40 and tethering elements 46 will be substantially hidden from view.

Referring now to FIG. 2, an inflatable curtain structure 40 according to the present invention is illustrated. As shown, the inflatable curtain structure 40 preferably includes a gas inlet opening 44 in communication with the inflator 42 so as to permit the introduction of a gaseous inflating medium into the inflatable curtain structure 40 upon the occurrence of predetermined vehicle conditions. According to the potentially preferred embodiment of the present invention, the inflatable curtain structure 40 will be formed by adjoining panels of substantially pliable material around a perimeter edge so as to form a substantially gas tight enclosure such that the inflation gas exiting the inflator 42 may be contained during an extended roll-over event. It is contemplated that such a structure may be formed either from a single blank of material which is folded upon itself and thereafter seamed around its edges or may be formed from two or more panels of material which are joined together in a cooperative relationship.

As best illustrated through reference to FIG. 3, it is contemplated that regardless of the formation practices which are used to form the inflatable curtain structure 40 that such inflatable curtain structure 40 will preferably include a front impact surface 50 which faces towards the occupant to be protected during a collision event and a rear surface 52 which faces away from the occupant to be protected during a collision event and towards the adjacent side window 20. An expansible gas containment chamber 54 is bounded between the front impact surface 50 and the rear surface 52. In addition, as best illustrated in FIG. 2, it is contemplated that the inflatable curtain structure may include a pattern of regions of substantially noninflatable character 56 formed by joining together the front impact surface 50 and the rear surface 52 in areas where inflation is not desired thereby precluding expansion of the cushion in those regions and reducing the total volume of inflating gas necessary to achieve complete inflation.

The materials forming the inflatable curtain structure 40 are preferably of a substantially pliable character so as to permit the inflatable curtain structure 40 to be rolled or folded into a compact space beneath the trim adjacent the roof rail 30. Textile fabrics may be preferred. Woven or knitted fabrics of nylon or polyester may be particularly preferred.

In order to retain the inflating gas during an extended roll-over event, it is contemplated that the materials forming the inflatable curtain structure will be substantially impermeable to the inflation gas. It is contemplated that such low gas permeability may be achieved by providing a permeability blocking coating in the form of a film or dispersion of suitable material such as silicone, polyurethane, or polyamides across the inflatable portions of the front impact surface 50 and the rear impact surface 52.

It is contemplated that the panels of materials forming the inflatable curtain structure 40 may be joined together by traditionally sewing techniques as well as by alternative joining techniques as will be well known to those of skill in the art including by way of example only and not limitation, adhesive bonding, RF welding, and ultrasonic welding. It is contemplated that the regions of substantially non inflatable character 56 across the curtain structure 40 may also be introduced by such techniques.

As previously indicated, according to the potentially preferred embodiment of the present invention, the inflatable curtain structure 40 is attached to the frame of the vehicle 10 along the roof rail 30 or to some other suitably stable structure. By way of example only, it is contemplated that such attachment may be effected by use of screws or snap-in fasteners 58 (FIG. 3) which pass through fastening apertures 60 (FIG. 2) disposed through the inflatable curtain structure 40 along a pattern of attachment. As shown, it is contemplated that this pattern of attachment may be curved if desired so as to substantially correspond to the roof line of the vehicle 10.

According to the illustrated and potentially preferred embodiment of the present invention, the fastening apertures 60 will be located within attachment zones 70 wherein inflation is substantially restricted relative to other portions of the inflatable curtain structure 40. By way of example only, it is contemplated that such a zone of attachment may be introduced into the inflatable curtain structure 40 by joining together the front impact surface 50 and the rear surface 52 by appropriate seaming, adhesive bonding, or welding techniques. As illustrated, the attachment zones 70 preferably extend in a discontinuous segmented pattern across the length of the inflatable curtain structure 40 in a pattern substantially corresponding to the path of the roof rail 30.

As best illustrated through simultaneous reference to FIGS. 2 and 3, the expansible gas containment chamber 54 within the inflatable curtain structure 40 preferably includes a main body portion 64 which extends in a deployed state substantially downward away from the line of attachment upon inflation. The inflatable curtain structure 40 also preferably includes an integral inflatable upper portion 66 which is disposed generally above the line of attachment defined by the pattern of fastening apertures 60. Due to the discontinuous segmented pattern of the attachment zones 70 across the inflatable curtain structure 40, fluid communication is preferably maintained between the main body portion 64 and the upper portion 66 so as to permit inflation of both portions using a single common inflator 42.

In operation, upon inflation of the inflatable curtain structure 40 by the inflator 42, the expansion of the main body portion 64 of the expansible gas containment chamber 54 between the front impact surface 50 and the rear surface 52 will cause the main body portion 64 to extend downwardly away from the line of attachment along the roof rail 30 so as to cover at least a portion of the vehicle interior surface below the line of attachment. Simultaneously, the inflation of the inflatable upper portion 66 of the inflatable curtain structure 40 causes the upper portion 66 to expand upwardly away from the line of attachment towards the roof 26. However, due to the obstruction caused by the roof 26 as expansion proceeds, the expanded upper portion 66 of the inflatable curtain structure 40 is caused to bend downwardly in a substantially hinge-like fashion around the line of attachment formed by the fastening apertures 60. This substantially hinge-like rotation of the upper portion 66 of the inflatable curtain structure 40 causes the inflated upper portion 66 to extend at least partially over the region disposed along the line of attachment between the inflatable curtain structure 40 and the roof rail 30 as illustrated in FIG. 3 so as to provide a cushion barrier between the occupant 14 to be protected and that region.

It is to be understood that while the present invention has been illustrated and described in relation to certain potentially preferred embodiments, constructions, and procedures, that such embodiments, constructions, and procedures are illustrative only and that the present invention is in no event to be limited thereto. Rather, it is contemplated that modifications and variations embodying the principles of this invention will no doubt occur to those of skill in the art. It is thus contemplated and intended that the present invention shall extent to all such modifications and variations as may incorporate the broad aspects of the invention within the full spirit and scope of the appended claims and all equivalents thereto.

What is claimed is:

1. An inflatable curtain structure adapted to be deployed within the interior of a transportation vehicle so as to cover an area below a roof and adjacent to an occupant within the vehicle during a collision event, the curtain structure comprising:

a main body portion including an impact surface facing towards the occupant upon inflation of the curtain structure and a rear surface facing away from the occupant upon inflation of the curtain structure;

a plurality of attachment zones of restricted inflatable expansion adapted to be operatively connected to the vehicle at locations disposed substantially along a roof rail of the vehicle; and an inflatable portion disposed substantially above the attachment zones and in fluid communication with the main body portion such that upon inflation of the inflatable curtain structure the main body portion expands in covering relation to a portion of the interior of the vehicle below the roof rail and the inflatable portion disposed above the attachment zones expands in cushioning relation between the roof rail and the occupant.

2. The invention according to claim 1, wherein the attachment zones extend in a hinge forming pattern between the main body portion and the inflatable portion disposed above the attachment zones such that upon contacting the vehicle roof, the inflatable portion disposed above the attachment zones rotates around the hinge forming pattern in cushioning relation between the occupant and the roof rail.

3. The invention according to claim 2, wherein the impact surface and the rear surface are joined together to form regions of substantially noninflatable character extending in a predetermined pattern across the main body portion.

4. An inflatable curtain structure adapted to be deployed within the interior of a transportation vehicle so as to cover an area below a roof and adjacent to an occupant within the vehicle during a collision event, the curtain structure comprising:

a main body portion including an impact surface facing towards the occupant upon inflation of the curtain structure and a rear surface facing away from the occupant upon inflation of the curtain structure; and an inflatable portion disposed above the main body portion and in normal fluid communication with the main body portion such that upon inflation of the inflatable curtain structure the inflatable portion disposed above the main body portion expands in cushioning relation between a structural roof rail of the vehicle and the occupants wherein the curtain structure is adapted to be attached to an underlying support structure at a plurality of attachment zones extending in a segmented pattern at least partially across the length of the curtain structure such that upon inflation of the curtain structure the attachment zones comprise a hinge between the main body portion and the inflatable portion disposed above the main body portion.

5. The invention according to claim 4, wherein the main body portion and the inflatable portion disposed above the main body portion are inflatable by a single common inflator.

6. The invention according to claim 4, wherein apertures for acceptance of fastening elements are disposed through the attachment zones.

7. The invention according to claim 4, wherein the impact surface and the rear surface are joined together to form regions of substantially noninflatable character extending in a predetermined pattern across the main body portion.

8. The invention according to claim 7, wherein the impact surface and the rear surface are joined together by sewing.

9. The invention according to claim 7, wherein the impact surface and the rear surface are joined together by welding.

10. The invention according to claim 7, wherein the impact surface and the rear surface are joined together by adhesive bonding.

11. An inflatable curtain structure adapted to be deployed within the interior of a transportation vehicle so as to cover an area below a roof and adjacent to an occupant within the vehicle during a collision event, the curtain structure comprising:

a main body portion including an impact surface facing towards the occupant upon inflation of the curtain structure and a rear surface facing away from the occupant upon inflation of the curtain structure;

an inflatable portion disposed above the main body portion, a plurality of attachment zones disposed in a discontinuous hinge-forming pattern at least partially along the length of the curtain structure between the main body portion and the inflatable portion disposed above the main body portion, wherein at least a portion of the attachment zones are adapted for acceptance of fastening elements therethrough for operative attachment of the curtain structure to a structural roof rail of the vehicle; and a gas inlet opening feeding into the main body portion;

the inflatable portion disposed above the main body portion being in normal fluid communication with the main body portion across the pattern of attachment zones such that upon introduction of an inflation gas through the gas inlet opening and into the main body portion the main body portion expands downwardly away from the roof rail and a portion of the inflation gas travels into the inflatable portion disposed above the main body portion whereby the inflatable portion disposed above the main body portion expands in cushioning relation between the roof rail and the occupant.

12. The invention according to claim 11 wherein the pattern of attachment zones includes an elongate blocking segment extending a distance along the length of the curtain structure between the main body portion and the inflatable portion disposed above the main body portion, the elongate blocking segment being disposed adjacent to the gas inlet opening such that the inflation gas travels a distance past the elongate blocking segment before passing into the inflatable portion disposed above the main body portion.

13. The invention according to claim 11, wherein the impact surface and the rear surface are joined together to form regions of substantially noninflatable character extending in a predetermined pattern across the main body portion.

14. The invention according to claim 11, wherein the impact surface and the rear surface are joined together by sewing.

15. The invention according to claim 11, wherein the impact surface and the rear surface are joined together by welding.

16. The invention according to claim 11, wherein the impact surface and the rear surface are joined together by adhesive bonding.

* * * * *